(No Model.)

F. A. HILL.
PLOW AND CULTIVATOR FRAME.

No. 283,394. Patented Aug. 21, 1883.

Attest:
F. L. Middleton
David H. Mead.

Inventor
Frank A Hill
By Joyce & Spear
Att'ys

UNITED STATES PATENT OFFICE.

FRANK A. HILL, OF BENICIA, CALIFORNIA.

PLOW AND CULTIVATOR FRAME.

SPECIFICATION forming part of Letters Patent No. 283,394, dated August 21, 1883.

Application filed March 30, 1883. (No model.)

*To all whom it may concern:*

Be it known that I, FRANK A. HILL, of Benicia, in the county of Solano and State of California, have invented a new and useful Improvement in Plow and Cultivator Frames; and I do hereby declare that the following is a full, clear, and exact description of the same.

My invention relates to an improved manner of and means for adjusting the frame of a gang plow or cultivator vertically; and the object of the invention is to connect the framework by adjustable arms to a single operating-lever, so that the front and rear ends of the frame may be simultaneously adjusted by one man at one operation.

The invention consists in combining with the frame-work and carrying-wheels an operating-lever and adjustable connections, in the manner now to be more fully described.

Figure 2:
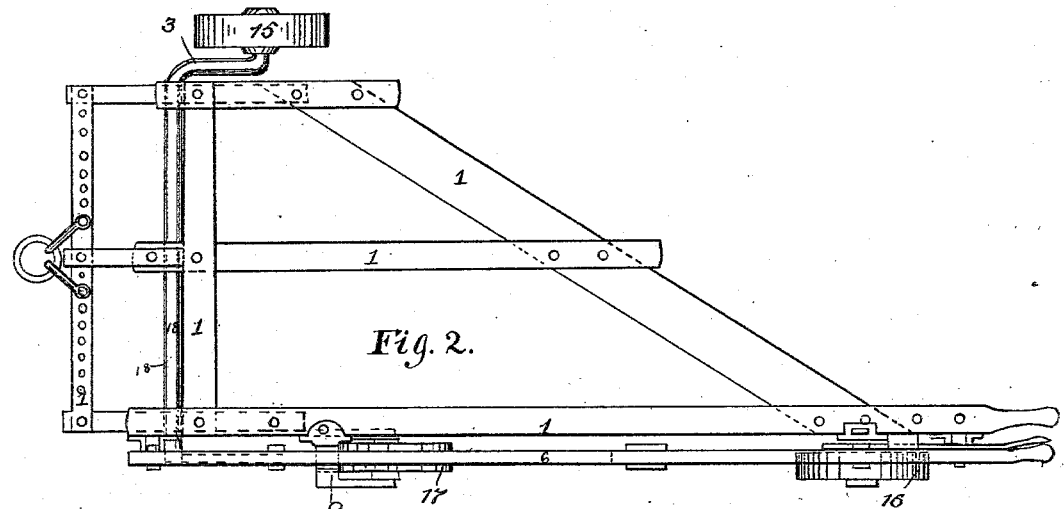
Figure 1:
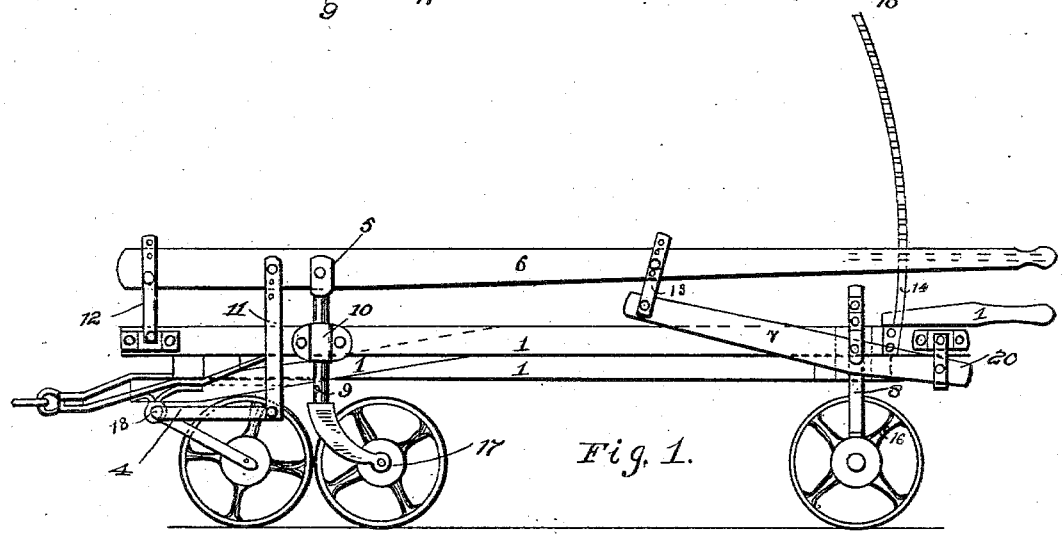

In the drawings, Figure 1 is a side elevation of the carrying-wheels, frame, and operating mechanism. Fig. 2 is a plan view.

The frame-work is represented in the drawings at 1. It is preferably of triangular form, as shown in Fig. 2, and is provided with the ordinary horse-attaching devices, and with means for connecting the plows or shovels. Journaled in bearings in the forward end of the frame is an axle, 18, which is cranked outside the frame-work at both ends, as shown at 3 4. On one end of the axle is mounted the wheel 15. The caster-wheel 17 is journaled in bearings in the lower end of a hanger or standard, 9, which is free to turn horizontally in a box, 10, secured to the frame-work, and thus permits the caster to turn freely. The rear supporting-wheel, 16, is journaled in bearings in a vertically-adjustable standard, 8, which slides in a suitable guide in the main frame, as shown in Fig. 1. The operating-lever 6 is pivoted to a standard or strap, 12, which thus connects it to the frame. The end of the lever is secured adjustably to the strap by means of a pin adapted to engage with any one of a series of holes in the strap. Connected to the lever 6 is an arm, 11, the lower end of which is secured to the crank 4 of the axle 18. The sliding standard 9 of the caster is directly connected to the lever 6 by a swivel-cap, 5, which permits the said standard to slide freely in the box 10, and also to turn. The rear wheel, 16, is connected to the lever 6 by means of a connecting arm or lever, 7. The lever 7 is adjustably pivoted to the rear end of the frame, as shown at 20, and is connected to the lever 6 by a strap or link, 13. Such lever is attached near its middle to the sliding standard 8, in which the wheel 16 is journaled. The lever 6 is provided with a spring-pawl, of any suitable construction, which engages with the teeth of a rack, 14, and holds the lever in any position desired.

It will be evident now, from the description and drawings, that if the lever 6 be elevated from the position shown in Fig. 2, it will produce a simultaneous elevation of the three wheels and a relative depression of the whole frame. The cranked axle will turn in its bearings, while the standards 8 and 9 will slide upward in their boxes or guides. Of course the standards and the lever 7 can be so adjusted relatively, as provided for, that the raising of the lever will produce any degree of inclination in the frame that may be desired, or that such frame can be raised vertically and held at any height.

I do not confine myself to the precise manner of attaching the levers and arms, as any arrangement for adjustably securing such parts to the frame and to each other may be employed.

Having thus fully described my invention, what I claim as new is—

1. The combination, with the frame and the carrying-wheel 15, of the axle having double cranks, the arm connected to such axle, and the lever 6.

2. The combination of the frame, the lever 6, the cranked axle having the wheel 15 journaled thereon, the caster-wheel 17 and its sliding standard, and the wheel 16, connected to the lever 6 by the arm 7.

In testimony whereof I have signed my name to this specification in the presence of two subscribing witnesses.

FRANK A. HILL.

Witnesses.
WM. H. RULOSSEN,
HENRY R. MILLER.